United States Patent
Feng

(10) Patent No.: US 9,417,662 B1
(45) Date of Patent: Aug. 16, 2016

(54) PROTECTIVE CASE FOR ELECTRONIC PRODUCT

(71) Applicant: Guangzhou Wenyi Communication Equipment Co., Ltd., Guangdong Province (CN)

(72) Inventor: Youru Feng, Guangdong Province (CN)

(73) Assignee: Guangzhou Wenyi Communication Equipment Co., LTD., Guangdong Province (CN)

( * ) Notice: Subject to any disclaimer, the term of this patent is extended or adjusted under 35 U.S.C. 154(b) by 0 days.

(21) Appl. No.: 14/750,878

(22) Filed: Jun. 25, 2015

(30) Foreign Application Priority Data

Mar. 19, 2015 (CN) .................. 2015 2 0158148 U

(51) Int. Cl.
| | |
|---|---|
| H04M 1/02 | (2006.01) |
| G06F 1/16 | (2006.01) |
| A45C 11/00 | (2006.01) |
| H04B 1/3888 | (2015.01) |
| A45C 13/10 | (2006.01) |
| A45C 13/02 | (2006.01) |

(52) U.S. Cl.
CPC .............. *G06F 1/1656* (2013.01); *A45C 11/00* (2013.01); *A45C 13/02* (2013.01); *A45C 13/1069* (2013.01); *G06F 1/1662* (2013.01); *H04B 1/3888* (2013.01); *A45C 2011/003* (2013.01)

(58) Field of Classification Search
CPC ..... H04B 1/3888; H04B 1/3877; H04M 1/04; H04M 1/026; H04M 1/72519; G06F 1/16; G06F 1/1616; G06F 1/1628; G06F 1/1632; G06F 3/023; A45C 11/00; A45C 13/002; F16M 11/00
See application file for complete search history.

(56) References Cited

U.S. PATENT DOCUMENTS

| | | | |
|---|---|---|---|
| 2013/0134061 A1* | 5/2013 | Wu ....................... | G06F 1/1626 206/320 |
| 2015/0083615 A1* | 3/2015 | Lay ........................ | F16M 11/00 206/45.24 |
| 2015/0296068 A1* | 10/2015 | Chin ..................... | G06F 1/1628 455/575.8 |
| 2015/0359120 A1* | 12/2015 | Huang ................... | A45C 11/00 206/45.23 |

\* cited by examiner

*Primary Examiner* — Thanh Le
(74) *Attorney, Agent, or Firm* — McDonnell Boehnen Hulbert & Berghoff LLP

(57) ABSTRACT

A protective case for electronic product is disclosed, including a keyboard fixing cover, a keyboard fixing base and an electronic product accommodating member, wherein the keyboard fixing base and the electronic product accommodating member are connected to both sides of the keyboard fixing cover respectively, and the keyboard fixing cover is foldable relative to the keyboard fixing base and the electronic product; a first recess is provided on the obverse side of the keyboard fixing cover, a second recess is provided on the obverse side of the keyboard fixing base, and when the keyboard fixing cover and the keyboard fixing base are folded together, the first recess and the second recess are butted together to form a cavity for accommodating the keyboard. In this way, the electronic product and the keyboard are not required to be kept separate when being carried.

8 Claims, 5 Drawing Sheets

PROTECTIVE CASE FOR ELECTRONIC PRODUCT

FIELD

The present disclosure relates generally to a protective case, and more particularly, to a protective case for electronic product.

BACKGROUND

With the development of technology and living standards, electronic products, and especially tablet computers, become increasingly popular among consumers. The tablet computer may be used as recreational and office appliance for being carried outdoors, due to its characteristics of practicality, portability, compactness and easy to be carried. However, most of the electronic products are not equipped with a keyboard, so they rely on the touch screen to provide input, which causes inconvenience in operation and a decrease in input efficiency. As a result, there are more and more people choosing to provide a keyboard to match up physically with an electronic product to increases operational efficiency.

In order to prevent the electronic product from being scratched or broken, people tend to use a protective case to enclose the electronic product for protection. However, the traditional protective case for electronic product can only protect the electronic product, but cannot store the keyboard, so the electronic product and its peripheral keyboard can only be kept separate when being carried, and can be assembled in use. Such protective case for electronic product not only causes inconvenience to use and carry, but also would not provide protection to the keyboard.

SUMMARY

In view of the above, in order to overcome the defects of the prior art, an object of the present disclosure is to provide a protective case for electronic product, which can store and protect both the electronic product and the keyboard.

According to an aspect of the present disclosure, a protective case for electronic product includes a keyboard fixing cover, a keyboard fixing base and an electronic product accommodating member, wherein the keyboard fixing cover is connected respectively on both sides thereof to the keyboard fixing base and the electronic product accommodating member, and the keyboard fixing cover is foldable relative to the keyboard fixing base and the electronic product accommodating member; in an unfolded state, one side of the protective case for electronic product adapted to mount the electronic product is called obverse side, and a side opposite to the obverse side is called reverse side; a first recess is provided on the obverse side of the keyboard fixing cover, a second recess is provided on the obverse side of the keyboard fixing base, and when the keyboard fixing cover and the keyboard fixing base are folded together, the first recess and the second recess are butted together to form a cavity for accommodating the keyboard.

In one embodiment, the electronic product accommodating member includes an accommodating positioning board and a support plate, the support plate includes a connection portion and a mounting portion, one side of the connection portion is connected with the keyboard fixing cover, the other side of the connection portion is connected with the mounting portion, the connection portion is foldable relative to the mounting portion, and the obverse side of the mounting portion is connected with the reverse side of the accommodating positioning board.

In one embodiment, the reverse side of the mounting portion is provided with an elastic band both ends of which are connected with the reverse side of the mounting portion.

In one embodiment, a first engagement device is provided on the keyboard fixing cover, and a second engagement device cooperating with the first engagement is provided on the keyboard fixing base.

In one embodiment, a magnet is provided in the second recess.

In one embodiment, the reverse side of the keyboard fixing base is provided with an elastic holding band both ends of which are connected with the reverse side of the keyboard fixing base.

In one embodiment, the reverse side of the keyboard fixing base is provided with at least one pocket each of which has at least one layer of bag.

In one embodiment, a penholder is provided at the side of the electronic product accommodating member away from the keyboard fixing cover, and the penholder is an elastic ring.

The present disclosure has the advantages as below.

When the electronic product is to be used, the protective case for electronic product mounts the electronic product on the obverse side of the electronic product accommodating member, the bottom of the electronic product is supported on the obverse side of the keyboard fixing cover, and the keyboard is placed on the second recess of the keyboard fixing base, to facilitate the use of the keyboard. And when the electronic product is not used, the keyboard fixing cover is folded with the keyboard fixing cover base, and the keyboard is placed in the cavity for accommodating the keyboard formed by the first recess and the second recess being aligned with one another and closed together, so that the electronic product and the keyboard are not required to be kept separate when being carried, which is convenient for use and carrying and has the effect of protecting the keyboard.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE PREFERRED EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
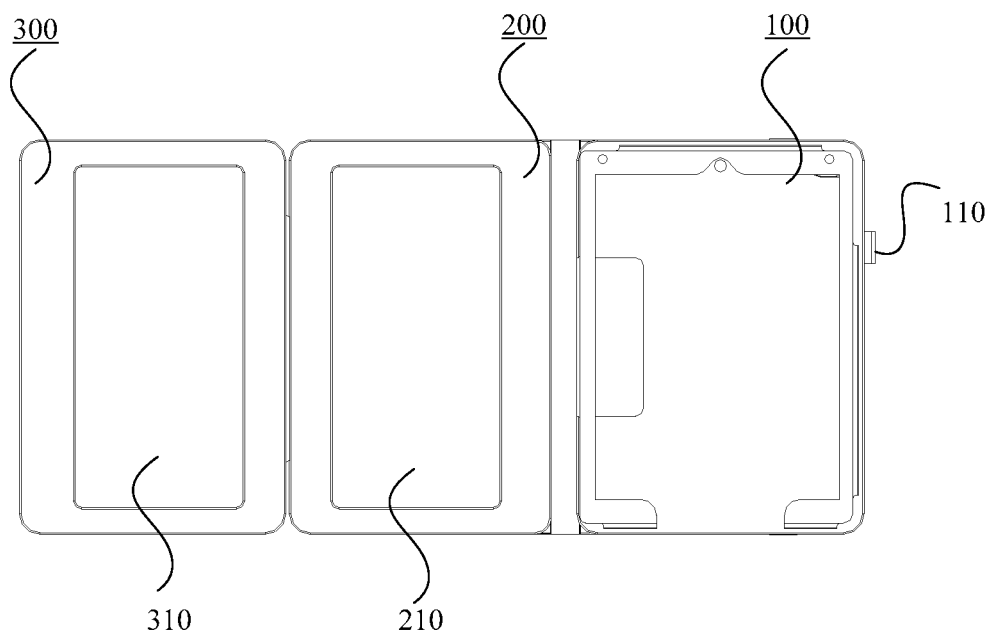
FIG. 1 is a schematic diagram illustrating a protective case for electronic product in a state that the protective case for electronic product is fully expanded according to one embodiment of the present disclosure.

As shown in FIG. 1, a protective case for electronic product includes a keyboard fixing cover 200, a keyboard fixing base 300 and an electronic product accommodating member 100, wherein the keyboard fixing base 300 and the electronic product accommodating member 100 are connected to both sides of the keyboard fixing cover 200 respectively, and the keyboard fixing cover 200 is foldable relative to the keyboard fixing base 300 and the electronic product 100. In an unfolded state, one side of the protective case for electronic product adapted to mount the electronic product is called obverse side, and a side opposite to the obverse side is called reverse side. A first recess 210 is provided on the obverse side of the keyboard fixing cover 200, a second recess 310 is provided on the obverse side of the keyboard fixing base 300, and when the keyboard fixing cover 200 and the keyboard fixing base 300 are folded together, the first recess 210 and the second recess 310 are butted together to form a cavity for accommodating the keyboard. The keyboard is placed on the second recess 310 when it is in use; and when the keyboard and the electronic product to be carried, the keyboard fixing cover 200 is folded with the keyboard fixing base 300, and the keyboard is placed in the cavity for accommodating the keyboard formed by the first recess and the second recess being aligned with one another and closed together, so that the electronic product and the keyboard are not required to be kept separate when being carried, which is convenient for use and carrying and has the effect of protecting the keyboard. A penholder 110 is provided at the side of the electronic product accommodating member 100 away from the keyboard fixing cover, and the penholder is consisted of an elastic ring that it is convenient for the user to store pens of various thicknesses, which is helpful for work.

Preferably, a magnet is provided in the second recess 310. When a keyboard is placed into the second recess 310, the magnet may absorb the keyboard to fix the keyboard in the second recess 310 without moving and falling.

Figure 2:
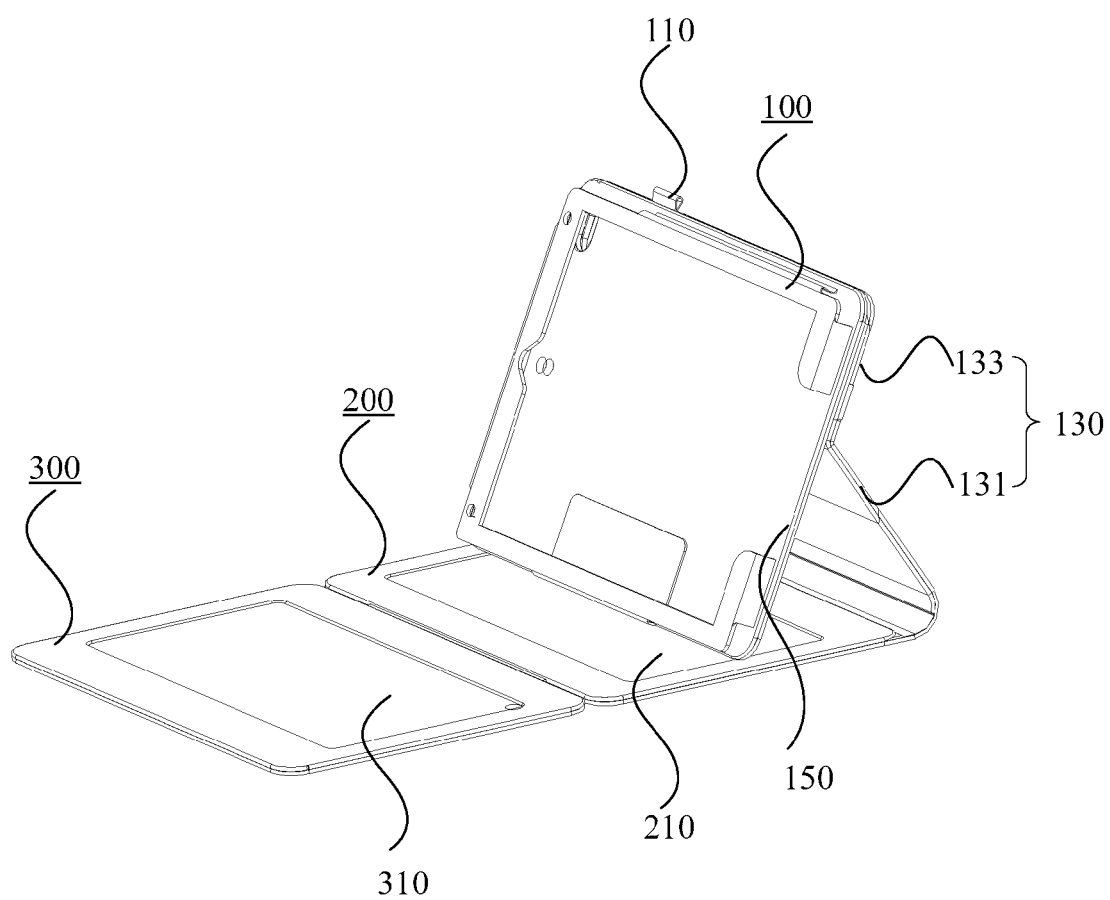
FIG. 2 is a schematic diagram illustrating a protective case for electronic product in a state that a keyboard is used according to one embodiment of the present disclosure.

As shown in FIG. 2, in the embodiment, the electronic product accommodating member 100 includes an accommodating positioning board 150 and a support plate 130, the support plate 130 includes a connection portion 131 and a mounting portion 133, one side of the connection portion 131 is connected with the keyboard fixing cover 200, the other side of the connection portion 131 is connected with the mounting portion 133, the connection portion 131 is foldable relative to the mounting portion 133, and the obverse side of the mounting portion 133 is connected with the reverse side of the accommodating positioning board 150. When the keyboard is used, the keyboard fixing cover 200 and the keyboard fixing base 300 may be laid out on a table, and the keyboard is placed in the second recess 310. Because the connection portion 131 is foldable relative to the mounting portion 133, and the obverse side of the mounting portion 133 is connected with the reverse side of the accommodating positioning board 150, the accommodating positioning board 150 may be foldable relative to the connection portion 131, and the angle between the accommodating positioning board 150 and the connection portion 131 may be changed. As a result, the electronic product placed on the accommodating positioning board 150 may be inclined at a certain angle relative to the keyboard fixing base 300 for watching the screen of the electronic product and operating conveniently.

Figure 3:
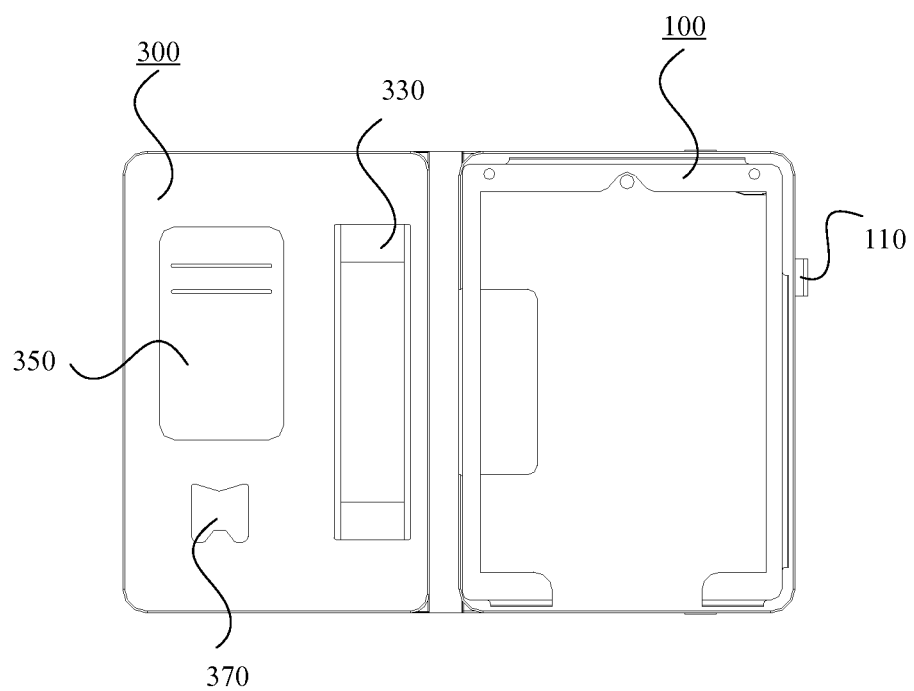
FIG. 3 is a schematic diagram illustrating a keyboard fixing base folded with a keyboard fixing cover according to one embodiment of the present disclosure.

As shown in FIG. 3, in the embodiment, the reverse side of the keyboard fixing base 300 is provided with an elastic holding band 330. When the electronic product is held in the hand, the hand may pass through the elastic holding band 330 that the hand and the protective case for electronic product are fixed together to prevent the electronic product from slipping off. The reverse side of the keyboard fixing base 300 is provided with a first pocket 350 and a second pocket 370, to facilitate storing and placing documents, business cards, SD cards, bank cards or the like in classifieds.

Figure 4:
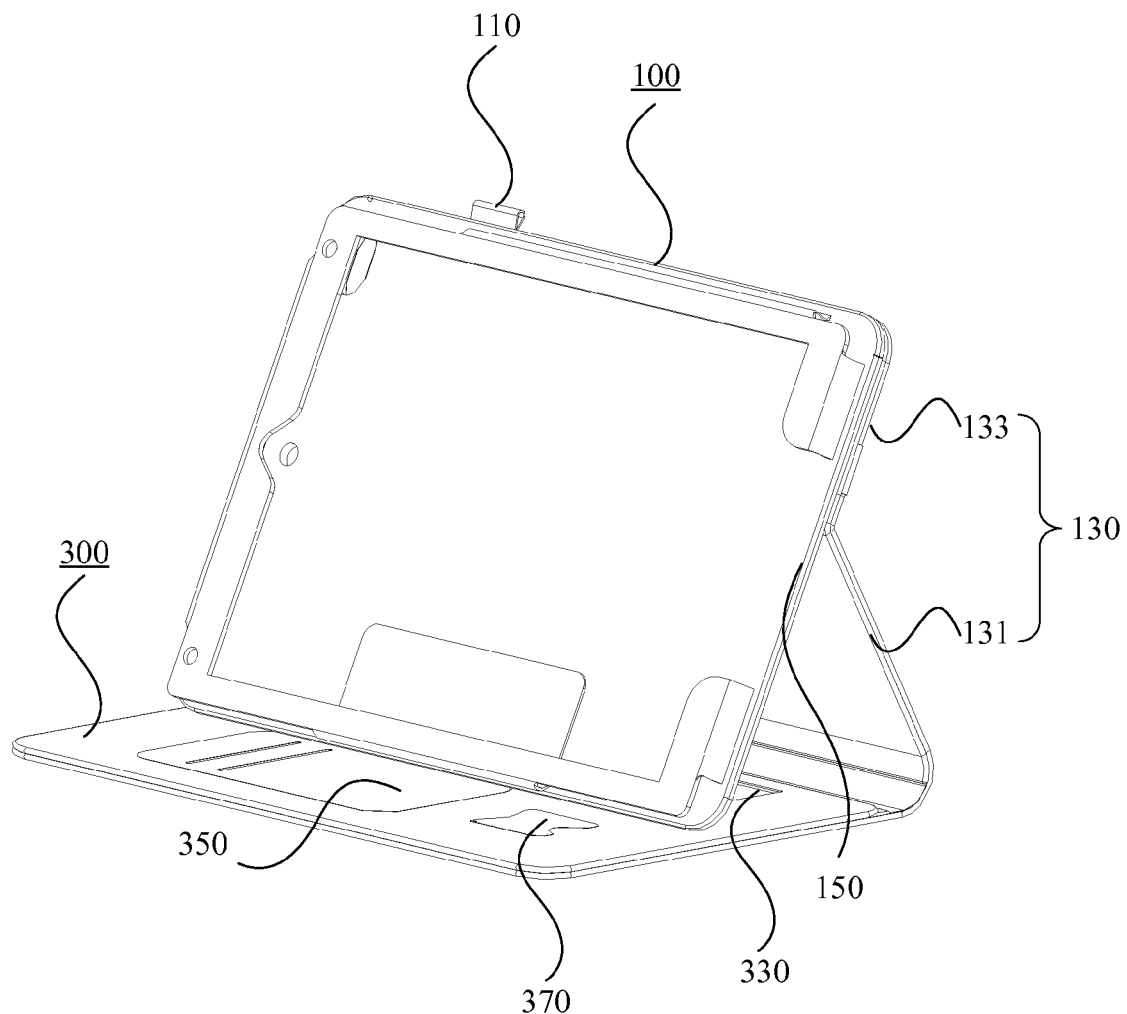
FIG. 4 is a schematic diagram illustrating a protective case for electronic product in a state that no keyboard is used according to one embodiment of the present disclosure.

As shown in FIG. 4, in the embodiment, when the electronic product is used while the keyboard is not used, the keyboard fixing cover 200 is folded with the keyboard fixing base 300, the keyboard is placed in the cavity for accommodating the keyboard formed by the first recess 210 and the second recess 310 being aligned with one another and closed together. Because the connection portion 131 is foldable relative to the mounting portion 133, and the obverse side of the mounting portion 133 is connected with the reverse side of the accommodating positioning board 150, the accommodating positioning board 150 may be foldable relative to the connection portion 131, and the angle between the accommodating positioning board 150 and the connection portion 131 may be changed. As a result, the electronic product placed on the accommodating positioning board 150 may be inclined at a certain angle relative to the keyboard fixing base 300 for watching the screen of the electronic product and operating conveniently.

Preferably, a first engagement device is provided on the keyboard fixing cover 200, and a second engagement device cooperating with the first engagement is provided on the keyboard fixing base 300. The first and second engagement devices may be magnet, Velcro or the like. When the keyboard fixing base 300 is folded with the keyboard fixing cover 200, the first and the second engagement devices cooperates with each other to make the keyboard be placed in the cavity for accommodating the keyboard more stably, so that the keyboard is not easy to fall.

Figure 5:
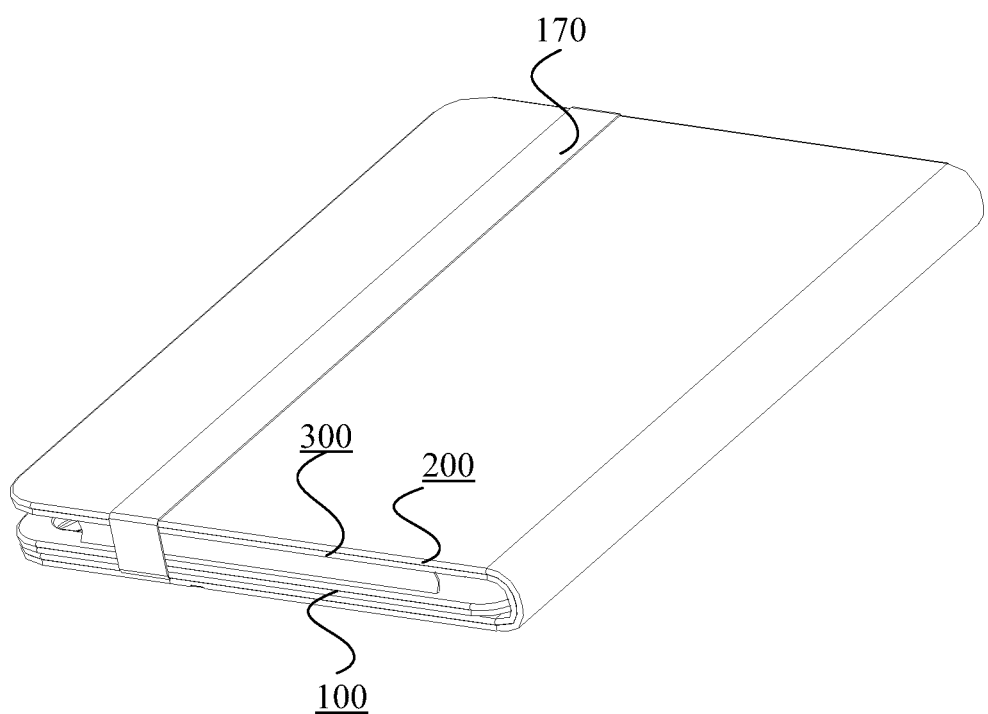
FIG. 5 is a schematic diagram illustrating a protective case for electronic product in a state that the protective case for electronic product is fully folded according to one embodiment of the present disclosure.

As shown in FIG. 5, in the embodiment, the reverse side of the mounting portion 133 is provided with an elastic band 170. When the protective case for electronic product is fully folded, the elastic band 170 may be turned to the reverse side of the keyboard fixing cover that the elastic band 170 encloses the protective case for electronic product to make the protective case for electronic product to be closed more tightly to prevent the keyboard and the electronic product from falling.

Each technical feature of the above embodiments may be combined arbitrarily, but the specification does not describe all possible combinations of each technical feature of the above embodiments for the sake of simplicity. It should be understood that the combinations of the technical features belong to the scope recorded in the specification as long as there is no conflict between the combinations.

The above embodiments are chosen and described in order to explain the principles of the disclosure and their practical application so as to activate others skilled in the art to utilize the disclosure. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

The invention claimed is:

1. A protective case for electronic product, comprising a keyboard fixing cover, a keyboard fixing base and an electronic product accommodating member, wherein the keyboard fixing cover is connected respectively on both sides thereof to the keyboard fixing base and the electronic product accommodating member, and the keyboard fixing cover is foldable relative to the keyboard fixing base and the electronic product accommodating member; in an unfolded state, one side of the protective case for electronic product adapted to mount the electronic product is called obverse side, and a side opposite to the obverse side is called reverse side; a first recess is provided on the obverse side of the keyboard fixing cover, a second recess is provided on the obverse side of the keyboard fixing base, and when the keyboard fixing cover and the keyboard fixing base are folded together, the first recess and the second recess are butted together to form a cavity for accommodating the keyboard.

2. The protective case for electronic product of claim 1, wherein the electronic product accommodating member comprises an accommodating positioning board and a support plate, the support plate comprises a connection portion and a mounting portion, one side of the connection portion is connected with the keyboard fixing cover, the other side of the connection portion is connected with the mounting portion, the connection portion is foldable relative to the mounting portion, and the obverse side of the mounting portion is connected with the reverse side of the accommodating positioning board.

3. The protective case for electronic product of claim 2, wherein the reverse side of the mounting portion is provided with an elastic band, both ends of which are connected with the reverse side of the mounting portion.

4. The protective case for electronic product of claim 1, wherein a first engagement device is provided on the keyboard fixing cover, and a second engagement device cooperating with the first engagement is provided on the keyboard fixing base.

5. The protective case for electronic product of claim 4, wherein a magnet is provided in the second recess.

6. The protective case for electronic product of claim 5, wherein the reverse side of the keyboard fixing base is provided with an elastic holding band, both ends of which are connected with the reverse side of the keyboard fixing base.

7. The protective case for electronic product of claim 6, wherein the reverse side of the keyboard fixing base is provided with at least one pocket each of which has at least one layer of bag.

8. The protective case for electronic product of claim 7, wherein a side of the electronic product accommodating member away from the keyboard fixing cover is provided with a penholder, which is an elastic ring.

* * * * *